United States Patent [19]
Haumann et al.

[11] Patent Number: 4,888,855
[45] Date of Patent: Dec. 26, 1989

[54] GONDOLA FOR THE TRANSPORT OF ANIMALS TO BE SLAUGHTERED, PREFERABLY HOGS, IN AN ANAESTHESIA SYSTEM

[75] Inventors: Klaus Haumann, Gentofte; Ejvind Kildegaard, Holbaek, both of Denmark

[73] Assignee: Butina I/S, Holbaek, Denmark

[21] Appl. No.: 154,954

[22] Filed: Feb. 10, 1988

[30] Foreign Application Priority Data

Feb. 10, 1987 [DK] Denmark .................. 0675/87

[51] Int. Cl.⁴ .................. A22B 3/00; B61D 9/14
[52] U.S. Cl. .................. 17/1 A; 105/241.2;
                                            105/261.1
[58] Field of Search .................. 105/239, 241.1, 242,
    105/241.2, 258, 261.1, 268, 270, 272, 274, 276;
    104/97; 198/365, 370, 372; 17/1 A, 1 R, 24, 44,
                                                44.1

[56] References Cited

U.S. PATENT DOCUMENTS

| | | | |
|---|---|---|---|
| 1,014,396 | 1/1912 | Hyde | 105/241.2 X |
| 2,160,303 | 5/1939 | Card | 105/241.2 X |
| 3,529,734 | 9/1970 | Marais | 105/241.2 X |
| 3,828,396 | 8/1974 | Wernberg | 17/1 A X |

FOREIGN PATENT DOCUMENTS 1170989 5/1964 Fed. Rep. of Germany ... 105/241.2

Primary Examiner—Johnny D. Cherry
Assistant Examiner—Joseph D. Pape
Attorney, Agent, or Firm—Cooper & Dunham

[57] ABSTRACT

A goldola for the transport of animals to be slaughtered, preferably hogs, in an anaesthesia system, said gondola (9) comprising two end gables including an outer end gable (10) and an inner end gable (11). The inner end gable (11) is permanently fastened to a bottom (14) and a second side wall (15). The bottom (14) with the inner end gables (11) and the second side wall (15) is pivotably mounted around a fixed rotational shaft (16). The gondola comprises furthermore a first side wall (17) pivotably mounted around a shaft (23) extending parallel to the shaft (16) between the two outer end gables (10). The upper parts of the inner end gables (11) adjacent the first side wall are provided with a traverse shaft extending in the longitudinal direction of the gondola. The end of the shaft facing the first side wall (17) carries a pulley in engagement with a guide track (20) on the first side wall (17), while the opposite end of said shaft carries a projecting pulley (37).

3 Claims, 4 Drawing Sheets

4,888,855

GONDOLA FOR THE TRANSPORT OF ANIMALS TO BE SLAUGHTERED, PREFERABLY HOGS, IN AN ANAESTHESIA SYSTEM

FIELD OF THE INVENTION

The invention relates to a gondola for the transport of animals to be slaughtered, preferably hogs, in an anaesthesia system, said gondola comprising two end gables and two side walls as well as a bottom.

BACKGROUND ART

DK-PS no. 126.549 discloses an anaesthesia system for animals to be slaughtered, said system comprising a paternoster elevator, where gondolas are used for carrying animals through a gas chamber whereupon the unconscious animals are delivered. Gondolas of various types can be employed in such an anaesthesia system. The unconscious animals are usually delivered from the gondolas by rotating the entire gondola so that the unconscious animals slide out of the gondola. A system with large gondolas holding several animals at the same time is, however, subjected to large loads when the entire gondola is rotated in order to deliver the animal.

SUMMARY OF THE INVENTION

The object of the invention is to provide a gondola where the unconscious animals are delivered in an easy and automatically initiated manner without the necessity of rotating the entire gondola.

According to the invention the bottom and the first side wall of the gondola are each pivotably mounted around their respective axes, the first side wall being pivotably mounted around an axis extending substantially parallel to the bottom and to the rotational axis of the bottom between the two end gables and being spaced from the bottom, and the bottom and the first side wall have engagement means for engaging with a permanently fixed guide means provided in the anaesthesia system, said guide means rotating the bottom and the first side wall around their respective rotational axes when meshing with the engagement means so that an intermediate slide gap for the unconscious animals is provided.

As a result a gondola is provided by means of which the animals are allowed to be delivered in a comparatively simple manner without the entire gondola being rotated. At the same time the slide gap for the unconscious animals is opened by means of permanently fixed guide means and it is not necessary to rotate the bottom more than is easily feasible for returning it to its starting position by means of a permanently fixed guide means. This is predominantly due to the fact that both the first side wall and the bottom are pivotably mounted such that both contribute to providing the slide gap. Thus each of them requires only a small rotation.

In a preferred embodiment of the invention the first side wall has at least one elongated, fixed guide track in which track a pulley engages, said pulley being pivotably mounted on the bottom or on a part permanently fastened to the bottom so that the rotation of either the bottom or the first side wall causes an automatic rotation of the first side wall or the bottom respectively. As a result a comparatively simple permanently fixed guide means can be used.

Each inventive end gable comprises an outer end gable and an inner end gable, the inner end gable being permanently fastened to the bottom and at least one of the inner end gables carries a pulley in engagement with the guide track on the first side wall. Consequently the pulley(s) are in engagement with a corresponding guide track on the first side wall are mounted comparatively easily.

Furthermore, the inventive engagement means are engagement pulleys journaled coaxially to their respective pulleys, said engagement pulleys being provided to be in rolling engagement with the permanently fixed, cam-forming guide means. As a result the permanently fixed cam-forming guide means directly affects the first side wall as well as the bottom with a minimum load.

In an especially preferred embodiment of the invention the second side wall may be permanently fastened to the bottom. This arrangement largely ensures that no part of an animal to be slaughtered gets caught when the bottom and the first side wall are rotated, as the second side wall follows the movement of the bottom.

Finally the inventive bottom and first side wall are pivotably mounted in such a way that due to the influence of the force of gravity they return to their starting position, in which the gondola is ready to receive conscious animals to be slaughtered.

BRIEF DESCRIPTION OF THE DRAWINGS

The invention is described in greater detail below and with reference to the accompanying drawings, in which.

DESCRIPTION OF THE PREFERRED EMBODIMENTS

Figure 1:
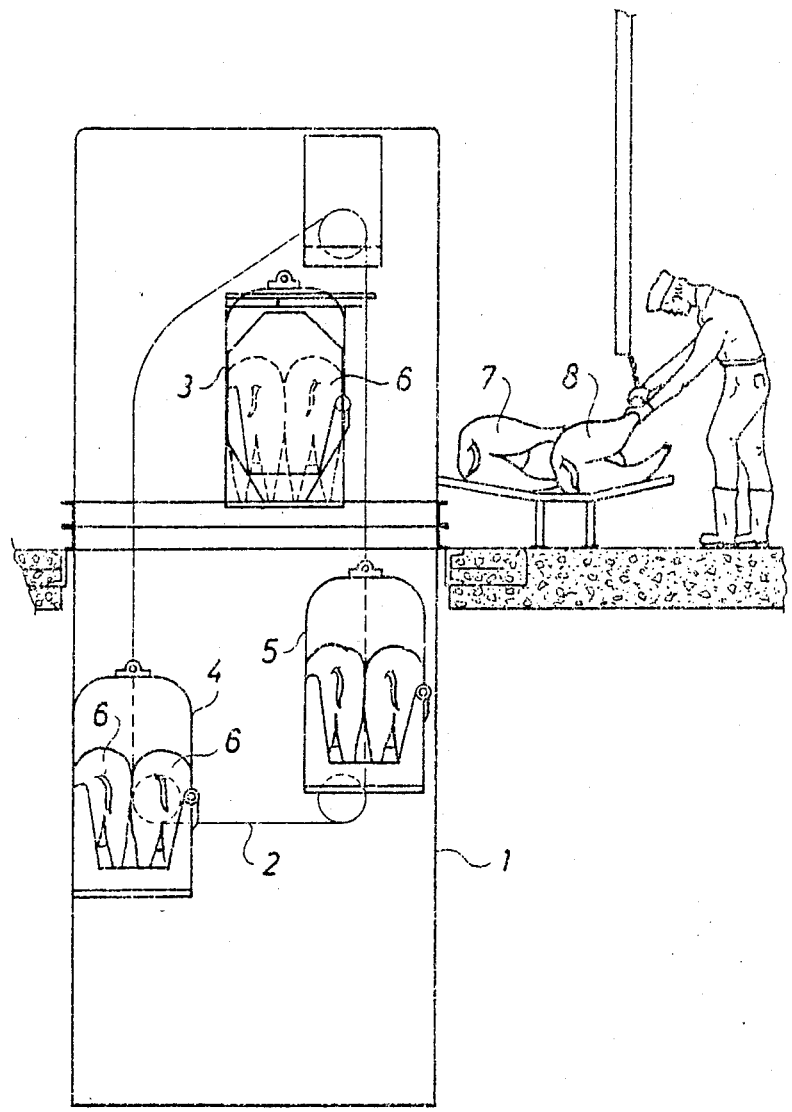
FIG. 1 is a diagrammatic view of a known anaesthesia system.

The anaesthesia system of FIG. 1 is a conventional anaesthesia system including a closed anaesthesia chamber 1, wherein a paternoster elevator 2 carries a number of gonolas 3, 4 and 5 around a path from a high level to a low level and back to the high level. At the low level the gondolas are passed through an atmosphere of anaesthetic gas, such as $CO_2$. At the high level there is an entrance to and an exit from the anaesthesia system. At the entrance the animals to be slaughtered, such as hogs 6, are led into the gondolas 3, 4 and 5. At the exit the unconscious animals are taken out of the gondolas, such as illustrated for hogs 7 and 8.

Figure 2:
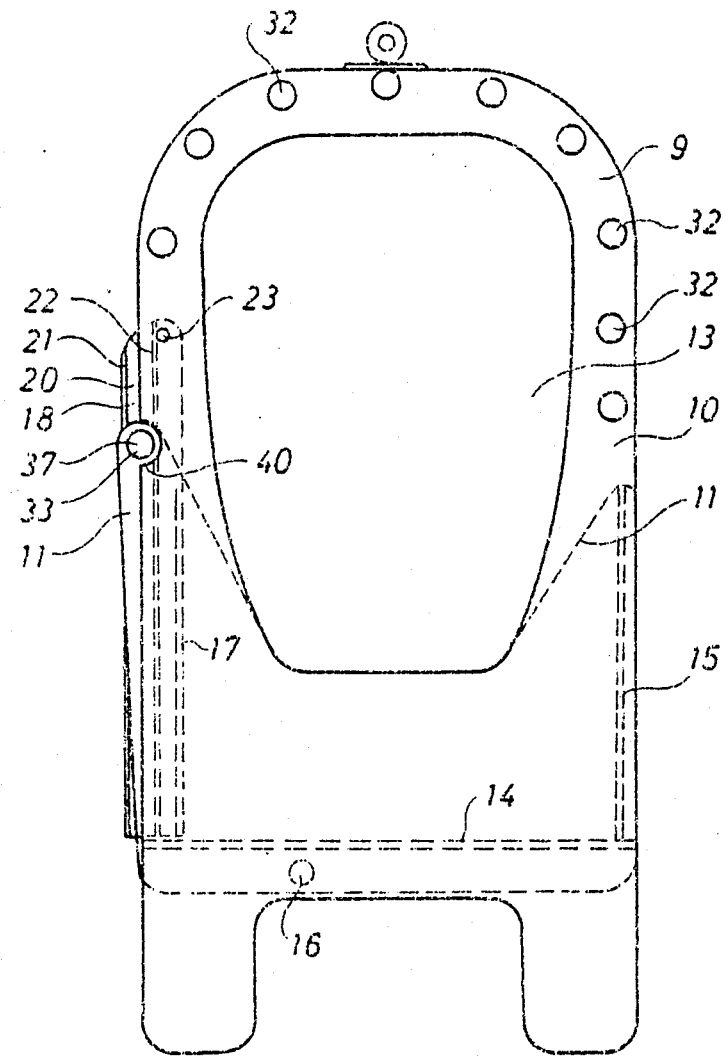
FIG. 2 is an end view of an inventive gondola.
Figure 3:
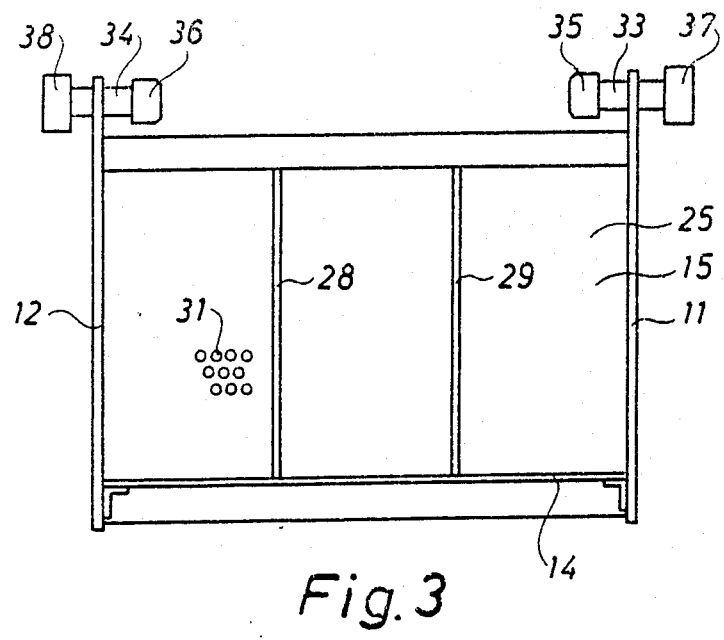
FIG. 3 is a side view of the bottom of the gondola with permanently fixed inner end gables and second side wall.

FIG. 2 is an end view of an inventive gondola 9. The gondola 9 comprises an end gable at each end, each end gable comprising an outer end gable 10 and an inner end gable 11, 12. One of the inner end gables is shown in FIG. 2 with predominantly dotted lines, while FIG. 3 shows both inner end gables 11, 12. At least at one end of the gondola the two inner end gables 11 and 12 in the position shown in FIG. 2 and the corresponding outer end gable 10 define an opening 13. At the entrance to the anaesthesia system the animals to be slaughtered are led through the opening 13 into the gondola.

Figure 4:
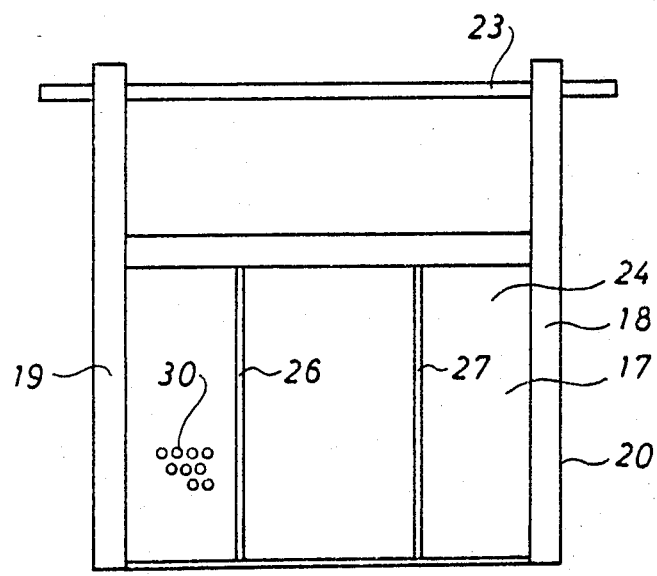
FIG. 4 is a side view of the first side wall of the gondola.

The two inner end gables are permanently connected with a bottom 14 and a second side wall 15. The bottom 14 and the second side wall 15 permanently connected with the bottom as well as the inner end gables 11 and 12 also permanently connected with the bottom are pivotably mounted on a common shaft 16 extending between and fastened to the two outer end gables 10. Furthermore the gondola 9 has a first side wall 17 placed opposite the side wall 15. The side wall 17 is shown from the side in FIG. 4. Each end of the side wall 17 is provided with a frame part 18 and 19 carrying a rail or guide track 20 on the side opposing the adjacent inner end gables 11 and 12. Each guide track 20 extends along the corresponding frame part 18 and 19 and its sides are defined by projecting flanges 21 and 22. The first side wall 17 is pivotably mounted in the gondola 9 by means of a rotational shaft 23 extending, when mounted, parallel to the rotational shaft 16 between the two outer end gables 10 at a considerable distance above the bottom 14. The rotational shaft 23 is connected with the first side wall 17 by means of the upwards projecting portions of the frame part 18 and 19, cf. FIG. 4. In FIG. 4 the rotational shaft 23 is shown together with the first side wall 17, but may also be fastened to the outer end gables 10 when mounted, while the first side wall is pivotably mounted on the shaft 23.

The first side wall 17 as well as the second side wall 15 comprise wall-forming panels 24 and 25, reinforced by means of vertical rods 26, 27 and 28, 29 respectively. The panels 24 and 25 may be perforated, as indicated at 30 and 31, for facilitating the passage of anesthetic gas. The same may be applied to the bottom 14.

Horizontal rods 32 are provided between the outer end gables 10 for reinforcing the gondola 9, said rods being fastened to the outer end gables in any suitable way, such as welding.

Figure 5:
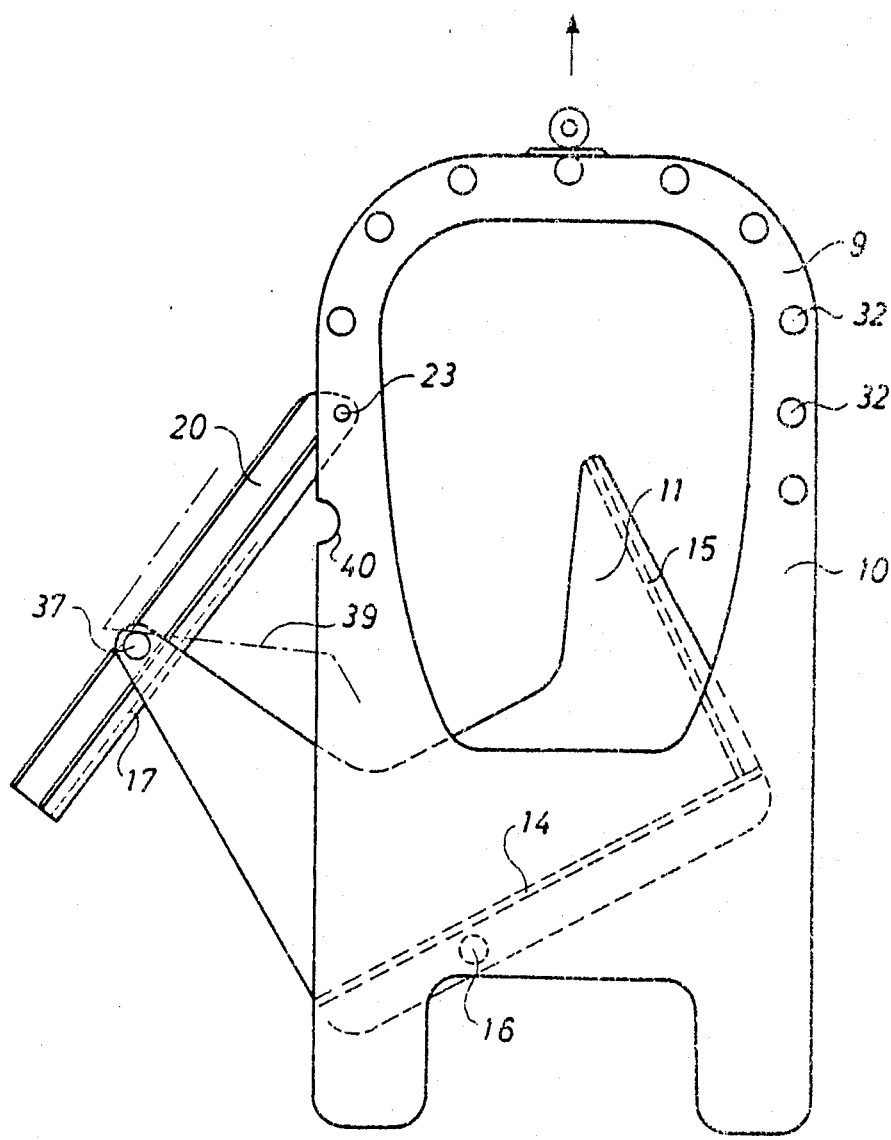
FIG. 5 is the same view as in FIG. 2 but with the bottom and the first side wall being mutually rotated into such a position that they form a slide gap for unconscious animals.

Each inner end gable has a protruding shaft 33 adjacent the first side wall 17, said shafts extending parallel to the rotational shaft 16 and projecting to each side of the corresponding end gable 11 and 12 respectively. The ends of the shafts 33 and 34 protruding in the direction of the first side wall 17 carry rotatably journaled pulleys 35 and 36 respectively. When the gondola is assembled the pulleys 35 and 36 respectively engage and cooperate with the adjacent guide track or rail 20 on the first side wall 17. The opposite ends of the shafts 33 and 34 carry the rotatably journaled pulleys 37 and 38 respectively. When mounted the pulleys 37 and 38 respectively protrude beyond the adjacent outer end gable 10 and are adapted to engage with a cam-forming guide means when the gondola moves the anaesthesia system from the low level upwards passing the exit of the anaesthesia system. In FIG. 5 the guide means is indicated by a dot-and-dash line and the reference numeral 39.

In the normal position of the gondola 9, shown in FIG. 2, where animals to be slaughtered are received and carried around within the anaesthesia system, the shafts 33 and 34 with corresponding projecting pulleys 37 and 38 are retained in recesses 40 in the side of the outer end gables 10.

During operation of the the gondola in the anaesthesia system the projecting pulleys 37 and 38 engage with the permanently fixed guide means 39 at the exit of the anaesthesia system, said guide means forcing the pulleys 37 and 38 by means of the cam effect outward and away from the adjacent outer end gable 10. As a result the bottom 14 and corresponding inner end gables 11 and 12 as well as the second side wall 15 are rotated counterclockwise around the rotational shaft 16 when seen in FIG. 2. Simultaneously the pulleys 35 and 36 engaging with the guide tracks 20 on the first side wall 17 press the first side wall outward by rotating clockwise around the rotational shaft 23, when seen in FIG. 5. During this rotation the pulleys 35 and 36 move downward along the corresponding guide track 20 and away from the rotational shaft 23 of the first side wall 17. At a predetermined time or at a predetermined level during the upward movement of the gondola 9 the bottom 14 has such a declination and the resulting slide gap between the bottom 14 and the first side wall 17 is of such a width that the unconscious hogs easily slide out. The position of the rotational shaft 16 and the declination of the bottom 14 in the position where the hogs slide out, may be adjusted in relation to the other parts participating in the rotation in such a way that the parts in question automatically return to the starting position of FIG. 2 when this is permitted by the permanently fixed guide means 39. Optionally the permanently fixed guide means may be adapted in such a way as to support this return movement.

The invention is described with regard to a preferred embodiment. Many alterations are, however, permitted without thus deviating from the scope of the invention. The engagement parts may, for example, be formed differently. Furthermore the guide track 20 may differ from the completely straight-lined form, so that the rotating movements are easier started and reversed.

We claim:

1. A gondola for the transport of animals to be slaughtered in an anaesthesia system, said gondola (9) comprising two end gables (10), two side walls (15, 17), and a bottom (14), wherein the bottom (14) and a first side wall (17) are each pivotably mounted around respective axes, said first side wall (17) being pivotably mounted around an axis extending substantially parallel to the bottom (14) and to the rotational axis of the bottom (14) between the two end gables (10) and being spaced from the bottom (14), said first side wall (17) having at least one elongated fixed guide track (20), which track (20) is engaged by a pulley (35, 36), said pulley (35, 36) being pivotably mounted relative to said bottom (14) so that the rotation of either the bottom (14) or the first side wall (17) causes an automatic rotation of the first side wall (17) or the bottom (14) respectively, means (33, 34, 37, 38) for engaging a permanently fixed guide means for rotating the bottom and the first side wall around their respective rotational axes from a starting position, in which the gondola is adapted to receive animals to be slaughtered, to a discharging position in which an intermediate slide gap for the animals is provided.

2. A gondola as in claim 1, wherein each end gable comprises an outer end gable (10) and an inner end gable (11, 12), the inner end gable being permanently fastened to said bottom (14) and carrying said pulley (35, 36) in engagement with said guide track (20) on the first side wall.

3. A gondola as in claim 1, wherein the engagement means (33, 34, 37 and 38) are engagement pulleys (37, 38) journalled coaxially to their respective pulleys (35, 36).

* * * * *